(12) United States Patent
Younce

(10) Patent No.: US 6,269,508 B1
(45) Date of Patent: Aug. 7, 2001

(54) APPARATUS FOR ALLOWING WHEELED NEGOTIATION OF AN OBSTACLE

(76) Inventor: Lloyd F. Younce, 1328 N. 48th St. #33, Phoenix, AZ (US) 85008

( * ) Notice: Subject to any disclaimer, the term of this patent is extended or adjusted under 35 U.S.C. 154(b) by 0 days.

(21) Appl. No.: 09/397,299

(22) Filed: Sep. 15, 1999

(51) Int. Cl.[7] .................................................. E01D 15/00
(52) U.S. Cl. ............................................................. 14/69.5
(58) Field of Search .................................. 14/69.5, 71.1, 14/72.5; 404/34, 35; D34/32

(56) References Cited

U.S. PATENT DOCUMENTS

| | | | | |
|---|---|---|---|---|
| D. 246,449 | * | 11/1977 | Poe ...................................... | 14/69.5 X |
| D. 297,064 | * | 8/1988 | Ball et al. ........................... | 14/69.5 X |
| D. 420,175 | * | 2/2000 | Garrels, Jr. ......................... | 14/69.5 X |
| 3,818,528 | * | 6/1974 | Petersen ................................ | 14/69.5 |
| 3,936,898 | * | 2/1976 | Poe ....................................... | 14/69.5 |
| 3,984,891 | * | 10/1976 | Weinmann .............................. | 14/69.5 |
| 5,287,580 | * | 2/1994 | Nelson .................................. | 14/71.3 |
| 5,347,672 | * | 9/1994 | Everard et al. ....................... | 14/69.5 |
| 5,440,773 | * | 8/1995 | Lentini .................................. | 14/69.5 |
| 5,446,937 | * | 9/1995 | Haskins ................................ | 14/69.5 |
| 5,517,708 | * | 5/1996 | Baranowski .......................... | 14/69.5 |
| 5,671,496 | * | 9/1997 | Smith ................................... | 14/69.5 |
| 5,933,898 | * | 8/1999 | Estes et al. ........................... | 14/69.5 |

* cited by examiner

*Primary Examiner*—David Bagnell
*Assistant Examiner*—Frederick L. Lagman
(74) *Attorney, Agent, or Firm*—Parsons & Goltry; Michael W. Goltry; Robert A. Parsons

(57) ABSTRACT

Apparatus for allowing wheeled passage between a first surface and a second surface separated by an obstacle, the apparatus comprising a base positionable on the first surface, and a framework having a proximal end mounted to the base and a distal end positionable on the second surface, the framework movable between a collapsed condition and an extended condition defining a substantially planar support surface between the proximal and distal ends for allowing wheeled passage between the first surface and the second surface.

16 Claims, 4 Drawing Sheets

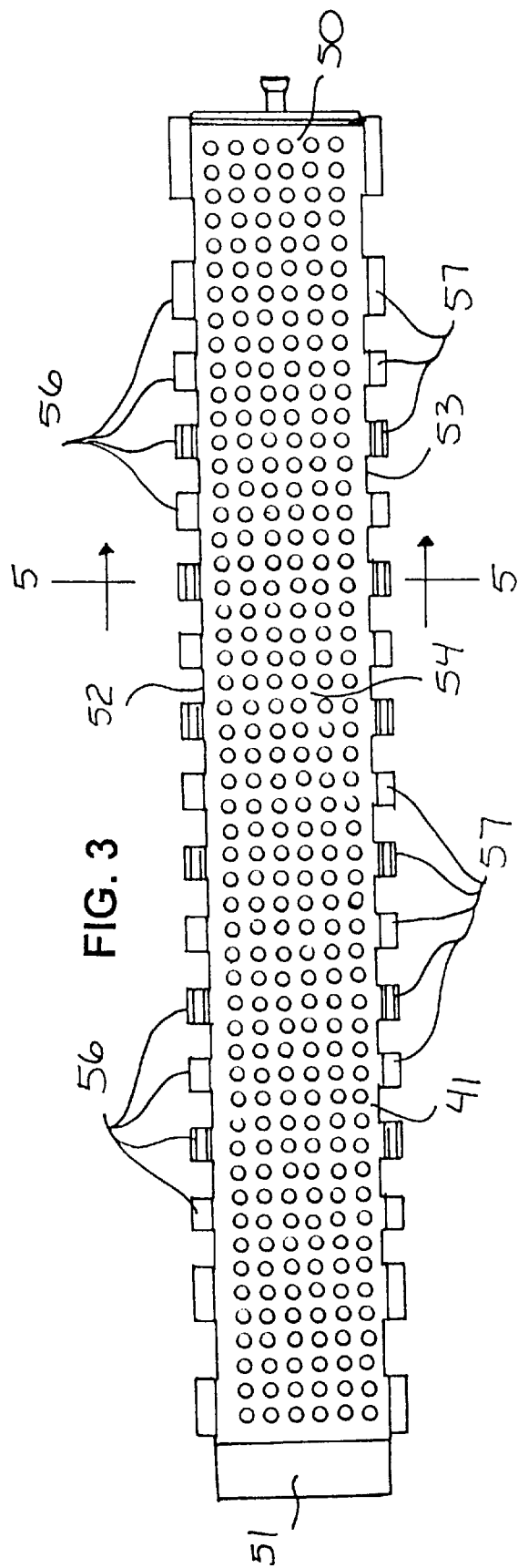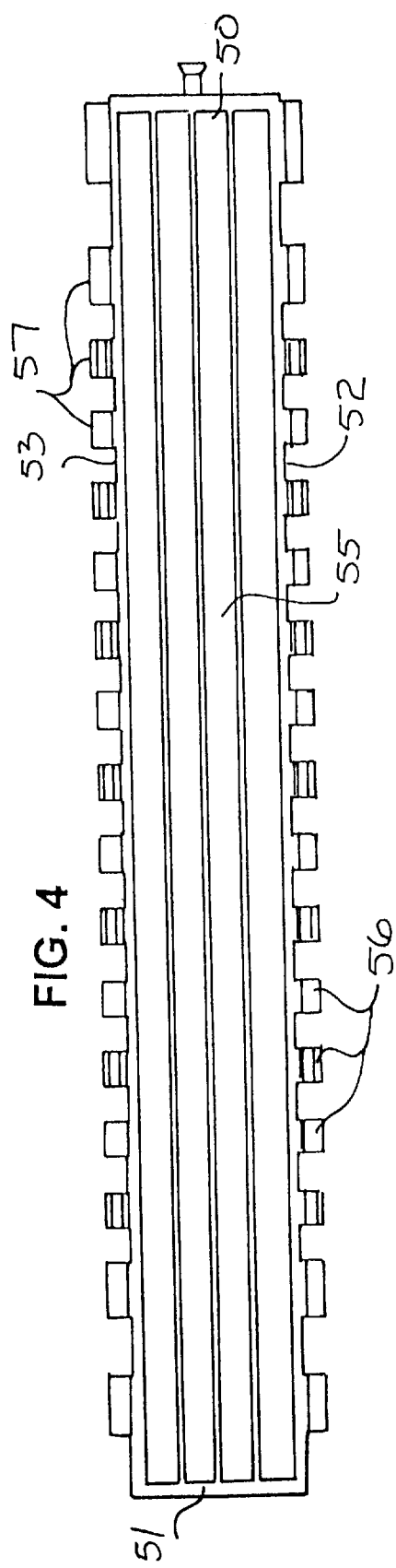

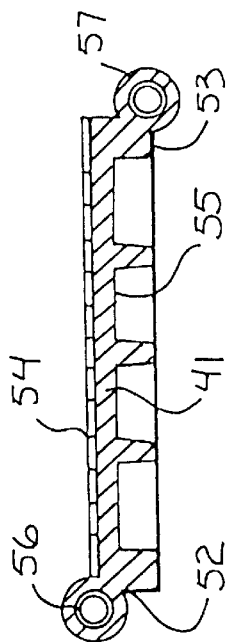
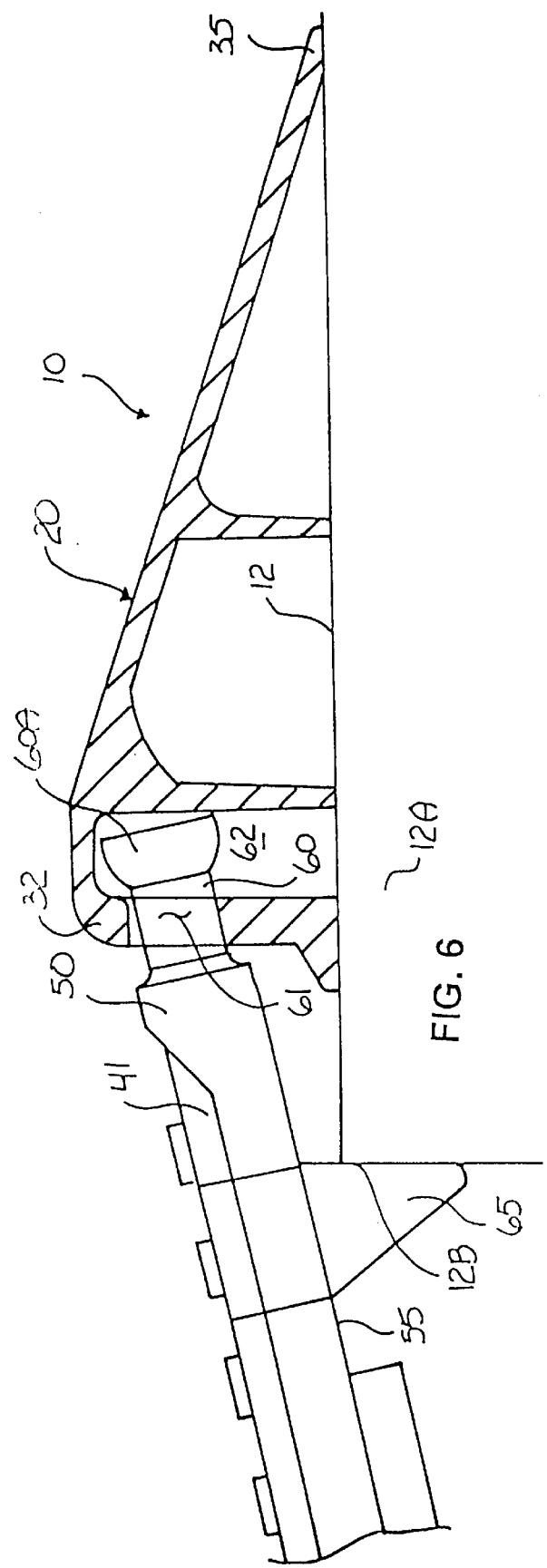

APPARATUS FOR ALLOWING WHEELED NEGOTIATION OF AN OBSTACLE

FIELD OF THE INVENTION

This invention concerns ambulatory apparatus and, more particularly, to apparatus for allowing wheeled negotiation of an obstacle.

BACKGROUND OF THE INVENTION

A wheelchair is a chair mounted on large wheels for the use of a sick or disabled person. Although wheelchairs provide the sick and disabled with an efficient means of travel, curbs, irregular surfaces and other obstacles can prove difficult, if not impossible, to negotiate. Short of improving the architecture and mobility of wheelchairs, little effort has been directed toward portable devices for use in aiding a user constrained to a wheelchair in negotiating curbs, irregular surfaces and other surface obstacles. In view of this deficiency, the need for certain new and useful improvements is evident.

Accordingly, it would be highly desirable to provide new and improved apparatus for allowing wheeled negotiation of an obstacle.

It is a purpose of the invention to provide new and improved apparatus that is light and easy to carry.

It is another purpose of the invention to provide new and improved apparatus that is easy to use.

It is still another purpose of the invention to provide new and improved apparatus that is inexpensive.

It is a further purpose of the invention to provide new and improved apparatus that is safe and very strong.

It is still a further provision of the invention to enhance the independence of physically challenged users that are dependent on wheelchairs.

It is yet still a further provision of the invention to reduce the burdensome costs normally associated with caring for the sick and disabled.

It is another provision of the invention to reduce depression that elderly, sick and physically challenged people constrained to wheelchairs normally experience.

It is still another provision of the invention to increase the mobility of sick and disabled people that are dependent on wheelchairs for providing day to day movement through their homes and communities.

SUMMARY OF THE INVENTION

The above problems and others are at least partially solved and the above purposes and others realized in new and improved apparatus for allowing wheeled passage between a first surface and a second surface separated by an obstacle. The apparatus is comprised of a base positionable on the first surface, and a framework having a proximal extremity mounted to the base and a distal extremity positionable on the second surface. The framework is movable between a collapsed condition and an extended condition defining a substantially planar support surface between the proximal and distal extremities for allowing wheeled passage between the first surface and the second surface. The collapsed condition preferably comprises a pleated condition, and the framework preferably comprises a plurality of plates arranged for movement between the collapsed condition and the extended condition. A plurality of extensions are supported at spaced intervals adjacent the proximal extremity of the framework. The extensions are mounted to the base for reciprocal movement for permitting movement of the framework between the collapsed and extended conditions. In a particular embodiment, the plurality of extensions are captured for reciprocal movement in an elongate groove defined by the base.

BRIEF DESCRIPTION OF THE DRAWINGS

The foregoing and further and more specific objects and advantages of the invention will become readily apparent to those skilled in the art from the following detailed description thereof taken in conjunction with the drawings in which:

FIG. 3 is a top plan view of one of a plurality of plates of the framework of FIG. 1;

FIG. 4 is a bottom plan view of the plate of FIG. 3;

FIG. 5 is a sectional view taken along line 5—5 of FIG. 3; and

FIG. 6 is a vertical sectional view of one of a plurality of plates of the framework shown as it would appear engaged to the base.

DETAILED DESCRIPTION OF A PREFERRED EMBODIMENT

The present invention provides, among other things, new and improved apparatus for allowing wheeled negotiation of an obstacle, such as by an occupant constrained to a wheelchair. The apparatus of the invention is easy to construct, easy to use and carry, and is easy to deploy by a sick or disabled person confined to a wheelchair.

Figure 1:
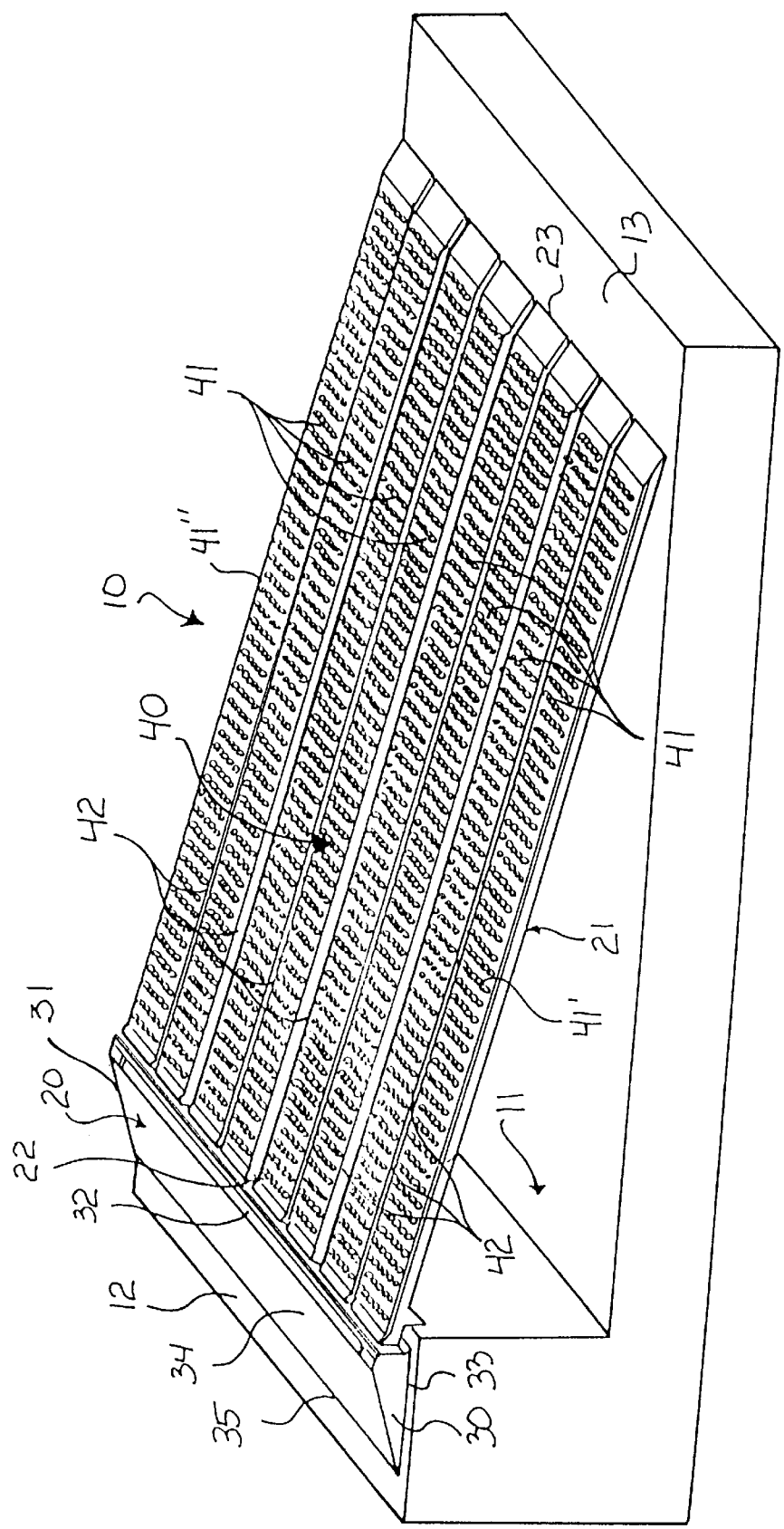
FIG. 1 is an isometric view of apparatus for allowing wheeled negotiation of an obstacle.
Figure 2:
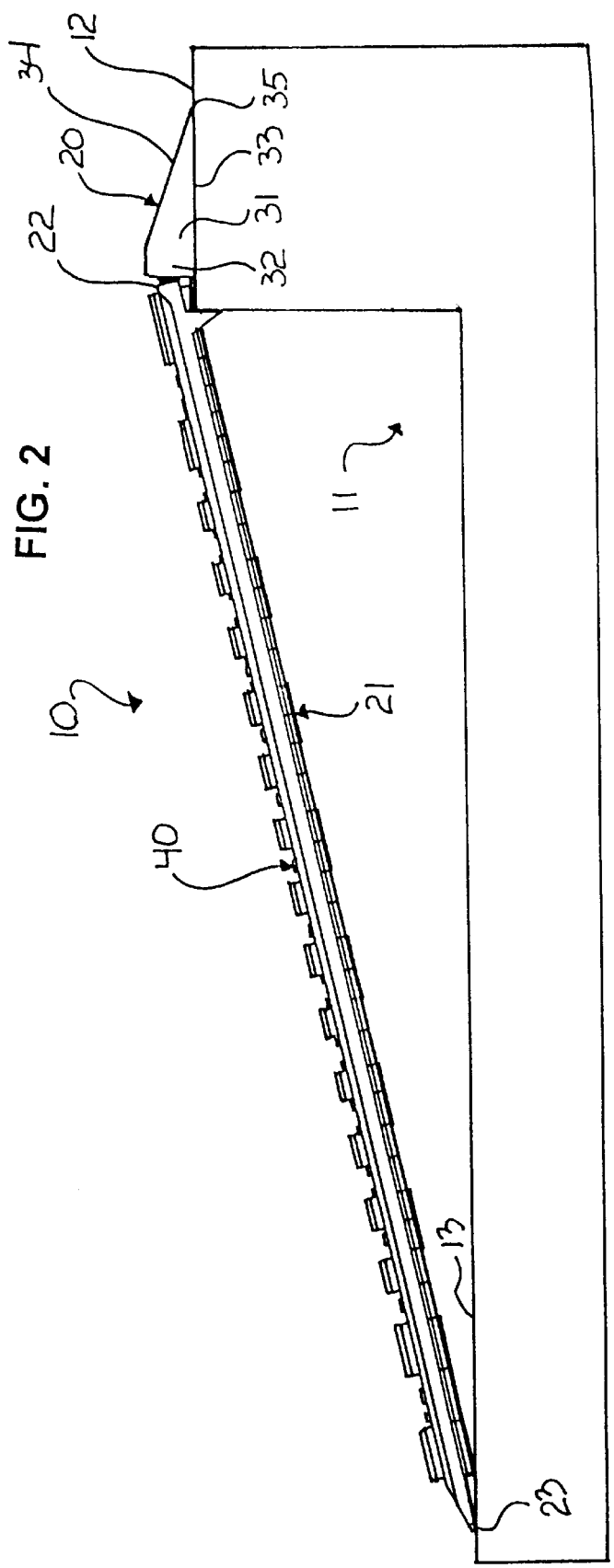
FIG. 2 is a side elevation view of the apparatus of FIG. 1.

Turning to the drawings, in which like reference characters indicate corresponding elements throughout the several views, attention is directed to FIG. 1 illustrating an isometric view of apparatus 10 for allowing wheeled negotiation of an obstacle 11. With additional reference to FIG. 2, obstacle 11 could be any sort of surface irregularity, bar, barrier, block, hindrance or other sort of surface impediment that would render wheeled passage over it dangerous, impossible or substantially impossible. In FIG. 1, shown are surfaces 12 and 13 separated by obstacle 11. In this embodiment, obstacle 11 comprises the elevational difference between the surfaces 12 and 13, which is a common sort of obstruction define by curbs.

Apparatus 10 may be constructed of plastic, nylon having a glass fill of 33% or other desired percentage, or other suitable material, and is comprised of a base 20 positionable on surface 12 and a framework 21. Framework 21 defines a proximal extremity 22 mounted to base 20 and an opposing distal extremity 23 positionable on surface 13. Base 20 is elongate and defines lateral or free extremities 30 and 31 (free extremity 30 not shown in FIG. 2), an enlarged end or head 32 and opposing faces or major surfaces 33 and 34 that meet to form an edge 35. Face 33 is shown as it would appear positioned on surface 12. Framework 21 is mounted to base 20 at proximal extremity 22 for movement between a collapsed condition and an extended condition as shown defining a substantially planar support surface 40 between proximal and distal extremities 22 and 23 for allowing wheeled passage between surfaces 12 and 13 for thus allowing the wheeled negotiation of obstacle 11.

In a preferred embodiment, the collapsed condition of framework 21 comprises a pleated condition. To this end, and with regard to FIG. 1, framework 21 preferably comprises a plurality of plates 41 arranged for movement between the pleated and extended conditions. Plates 41 are arranged in series and are coupled together pivotally or foldably at their major edges. These pivotal or folding connections between adjacent plates 41 define joints or folds 42. The folds 42 extend from proximal extremity 22 to distal extremity 23, and are arranged in substantially parallel relation and positioned at spaced intervals between the opposing terminal or end plates defined herein by the reference characters 41' and 41", respectively. In the extended condition, the plates 41 cooperate to define substantially planar surface 40. In the collapsed or pleated condition, adjacent ones of the plates 41 fold together to form a pleat. Each pleat is defined by a fold 42 in framework 21 by the doubling together of adjacent plates 41, thus forming a compact arrangement of pleats.

With momentary attention directed to FIGS. 3 and 4, each plate 41 is elongate, defines a proximal end 50, a distal end 51, opposing major edges 52 and 53, and opposing major surfaces 54 and 55. In the extended condition of framework 21, the proximal ends 50 of each plate 41 cooperate together to define the proximal extremity 22 of framework 21, and the distal ends 51 of each plate 41 cooperate together to define the distal extremity 23 of framework 21. At spaced intervals, major edges 52 and 53 support sleeves 56 and 57, respectively. For facilitating pivotal engagement, sleeves 56 of one plate 41 mesh with sleeves 57 of an adjacent plate 41. A pin or rod extends through the sleeves 56 and 57 to form a pivotal of folding connection between adjacent major edges 52 and 53. Regarding FIG. 5, sleeves 56 and 57 extend from major edges 52 and 53 in opposing directions, respectively, for facilitating the arrangement of alternating upward and downward folds in framework 21 for effecting formation of the pleated condition of the framework. As a matter of preference, major surface 54 of each plate 41 may be textured or constructed with treading for providing traction for the safe passage of a wheelchair, and major surface 55 may be constructed with ribs, corrugations or other suitable structure for enhancing strength and structural integrity. It will be understood that the terminal or end plates 41' and 41" are coupled to only one adjacent plate 41.

To allow movement of framework 21 between its pleated and extended conditions, each plate 41 is preferably mounted to base 20 for reciprocal movement between free extremities 30 and 31. Each plate 41 is mounted to base 20 for reciprocal movement in substantially the same fashion. To illustrate an embodiment of this engagement, attention is directed to FIG. 6. In FIG. 6, shown is an extension 60 supported by and extending outwardly or away from proximal end 50. Extension 60 extends into an opening 61 the leads to a groove 62. Opening 61 and groove 62 are defined by base 21 at or adjacent head 32, are elongate and extend substantially from free extremity 30 to free extremity 31 (free extremities 30 and 31 not shown in FIG. 6). Extension 60 defines or otherwise supports an enlargement 60A that resides in groove 62. Enlargement 60A is of a size too great to pass through opening 61, which effects the capturing of extension 60 by groove 62. Groove 62 and opening 61 are, however, sized for allowing extension 60 to move or slide reciprocally between the free extremities 30 and 31. Each plate 41 supports such an extension 60. Therefore, plates 41 together defined a plurality of extensions supported at spaced intervals that together with opening 61 and groove 62 allow movement of framework 21 between the pleated and extended conditions. Movement of framework 21 between the pleated and extended conditions may be carried out manually or with the aid of a motor or other mechanized device.

With continuing reference to FIG. 6, surface 12 is defined by a curb 12A that defines an edge 12B. To provide a secure positioning or placement of apparatus 10, each plate 41 may be provided with a stop 65 that extends outwardly from major surface 55 adjacent proximal end 50. Stop 65 is positioned so that in the extended condition of framework 21, apparatus 10 may be positioned for engaging stop 65 against edge 12B. Each plate 41 may, of course, be constructed to have such a stop, wherein the stops cooperate together to define a stop structure.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Apparatus for allowing wheeled passage between a first surface and a second surface separated by an obstacle comprising:

a base positionable on the first surface;

a framework having a proximal extremity mounted to the base and a distal extremity positionable on the second surface, the framework movable between a collapsed condition and an extended condition defining a substantially planar support surface between the proximal and distal extremities for allowing wheeled passage between the first surface and the second surface; and extensions supported adjacent the proximal extremity at spaced intervals, the extensions mounted to the base for reciprocal movement for permitting movement of the framework between the collapsed and extended conditions.

2. The apparatus of claim 1, wherein the collapsed condition comprises a pleated condition.

3. The apparatus of claim 1, wherein the framework comprises a plurality of plates arranged for movement between the collapsed condition and the extended condition.

4. The apparatus of claim 3, wherein the collapsed condition comprises a pleated condition.

5. The apparatus of claim 1, wherein the extensions are captured for reciprocal movement in an elongate groove defined by the base.

6. The apparatus of claim 1, further including stop structure carried by the framework and engagable with an edge of the first surface in the extended condition of the framework.

7. Apparatus for allowing wheeled passage between a first surface and a second surface separated by an obstacle comprising:

a base positionable on the first surface, the base defining a head and opposing faces that meet to form an edge;

a framework having a proximal extremity mounted to the head and a distal extremity positionable on the second surface, the framework movable between a collapsed condition and an extended condition defining a substantially planar support surface between the proximal and distal extremities for allowing wheeled passage between the first surface and the second surface; and extensions supported adjacent the proximal extremity at spaced intervals, the extensions mounted to the head for reciprocal movement for permitting movement of the framework between the collapsed and extended conditions.

8. The apparatus of claim 7, wherein the collapsed condition comprises a pleated condition.

9. The apparatus of claim 7, wherein the framework comprises a plurality of plates arranged for movement between the collapsed condition and the extended condition.

10. The apparatus of claim 9, wherein the collapsed condition comprises a pleated condition.

11. The apparatus of claim 7, wherein the extensions are captured for reciprocal movement in an elongate groove defined at the head.

12. The apparatus of claim 7, further including stop structure carried by the framework and engagable with an edge of the first surface in the extended condition of the framework.

13. Apparatus for allowing wheeled passage between a first surface and a second surface separated by an obstacle comprising:

a base positionable on the first surface;

a framework having a proximal extremity mounted to the base and a distal extremity positionable on the second surface, the framework movable between a pleated condition and an extended condition defining a substantially planar support surface between the proximal and distal extremities for allowing wheeled passage between the first surface and the second surface; and extensions supported adjacent the proximal extremity at spaced intervals, the extensions mounted to the base for reciprocal movement for permitting movement of the framework between the pleated and extended conditions.

14. The apparatus of claim 13, wherein the framework comprises a plurality of plates arranged for movement between the pleated condition and the extended condition.

15. The apparatus of claim 13, wherein the extensions are captured for reciprocal movement in an elongate groove defined by the base.

16. The apparatus of claim 13, further including stop structure carried by the framework and engagable with an edge of the first surface in the extended condition of the framework.

* * * * *